United States Patent
Gardes et al.

(10) Patent No.: US 6,901,168 B1
(45) Date of Patent: May 31, 2005

(54) METHOD FOR SEGMENTING AND IDENTIFYING A DOCUMENT, IN PARTICULAR A TECHNICAL CHART

(75) Inventors: Joël Gardes, Belfort (FR); Rémy Mullot, Fresquiennes (FR); Yves Lecourtier, La Garenne Colombe (FR); Jean-Marc Ogier, Montville (FR); Alain Lassaulzais, Perros Guirec (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/462,259
(22) PCT Filed: May 6, 1999
(86) PCT No.: PCT/FR99/01076
§ 371 (c)(1),
(2), (4) Date: May 10, 2000
(87) PCT Pub. No.: WO99/57677
PCT Pub. Date: Nov. 11, 1999

(30) Foreign Application Priority Data

May 7, 1998  (FR) ............................................ 98 05825

(51) Int. Cl.⁷ ................................................. G06K 9/46
(52) U.S. Cl. ....................... 382/203; 382/257; 382/259; 382/308; 358/453
(58) Field of Search ................................ 382/169, 170, 382/171, 172, 176, 181, 185, 186, 187, 188, 189, 190, 195, 197, 198, 203, 205, 218, 239, 257, 258, 259, 282, 283, 306, 308, 102; 358/453, 462, 466

(56) References Cited

U.S. PATENT DOCUMENTS 5,142,589 A  *  8/1992  Lougheed et al. .......... 382/102
5,465,308 A  * 11/1995  Hutcheson et al. ......... 382/159
5,748,805 A  *  5/1998  Withgott et al. ............ 382/306

OTHER PUBLICATIONS

IEEE Transactions on Systems, Man & Cybernetics; A Threshold Selection Method From Gray–Level Histograms; Nobuyuki Otsu, Jan. 1979, vol. smc9, No. 1, pp. 62–66.

B. Taconet et al., Deux Algorithmes De Squelettisation, In: Reconnaissance automatique de l'ecrit BIGRE 68, May 1990, pp. 68–76 (English abstract included).

XP–002090976, Anonymous: "Adaptive Threshold Technique for Local Clutter Suppression, Jun. 1981".

XP–002090975, Ogier J–M et al: "Interpretation de documents par cycles "perceptifs" de construction d'objets coherents".

XP–002090977, Kittler J et al: Minimum error thresholding.

XP–002090978, Mullot R et al: "An original approach for extracting circular shapes from technical charts".

XP–000437558, Ogier J M et al: "Original method for features extraction and vectorization: application to cadastral maps".

* cited by examiner

Primary Examiner—Mehrdad Dastouri
(74) Attorney, Agent, or Firm—Pearne & Gordon LLP

(57) ABSTRACT

The object of the invention is a method of processing information contained in an image, including:

a first processing (1-4), for defining an area of interest of the image (8), effecting an adaptive thresholding (1-8) of this area of interest in order to obtain a threshold image (10) of this area of interest, referred to as the first thresholded image, the segmentation (1-12) of the thresholded image, in order to obtain a first set of morphological layers (14-1, 14-2, 14-3, . . . ) of the thresholded image.

29 Claims, 10 Drawing Sheets

METHOD FOR SEGMENTING AND IDENTIFYING A DOCUMENT, IN PARTICULAR A TECHNICAL CHART

TECHNICAL FIELD AND PRIOR ART

The invention described relates to a method of processing information contained in an image and a method of recognising shapes. It finds an application in the digital processing of an image, in particular in the field of the recognition of documents, for example technical documents.

The recognition of documents and the recovery of data on the paper documents are currently of great importance. It is therefore necessary to develop strategies for the electronic management of documentation, with a view to recovering the information appearing thereon, possibly including acquiring documents existing on a paper medium or the like (tracings, microfiches, etc).

At the present time a certain number of techniques for converting drawings, notably technical drawings, are known, making it possible to supply company document databases.

Where the amount of documentation to be converted is high, and using a manual technique, the workload proves redhibitory. It is then in fact a case of capturing the textual and graphical information of the document using digitising tables. In addition, the quality of the data thus generated is not guaranteed. Such a conversion also often requires subcontracting, and poses the problem of the confidentiality of the data in a competition context.

Tools for the automatic or semi-automatic conversion of technical drawings are also known. These tools, and the corresponding techniques, have parameterising which is tricky, complex and very sensitive to variations in the document representation rules. If parasitic signals are present in the document, these tools progressively lose their effectiveness and require increasing manual processing.

Finally, techniques for the digital processing of images coded with a depth of 1 bit and of monochrome documents are known. Though these techniques allow a slight "cleaning" of the document, they do not make it possible to separate the useful information from the noise when the latter is preponderant. This is because a technical document is often the result of the superimposition of an essential document and dressing which is purely indicative for a given theme.

Moreover, the traditional tools for shape recognition, in particular in the case of long elements, often require the introduction of data by an operator, for example those concerning segments or their length. These tools are therefore not automated; and in addition this selection by hand does not account for the primitives used.

In addition, these traditional shape recognition tools have a complex man/machine interface, requiring on the part of the operator a learning which is not commensurate with his job. If he is, for example, a specialist on electrical distribution documentation, he will have to acquire competencies in the field of image processing.

Finally, these tools require significant manual corrections after shape recognition.

DISCLOSURE OF THE INVENTION

With respect to these techniques, the object of the invention is a method of processing an image, or information contained in an image, including:

a first processing, for defining an area of interest of the image, the effecting of an adaptive thresholding of this area of interest in order to obtain a thresholded image of this area of interest, referred to as a first thresholded image, the segmentation of the thresholded image, in order to obtain a first set of morphological layers of the thresholded image.

Morphological layer means a set of shapes having similar geometric characteristics (for example size, surfaces, internal or external perimeters, length to width ratio, etc). This similar character can be defined, for example in the case of a surface, by a density of pixels per surface element.

Effecting a first processing for defining an area of interest of the image, and then effecting processing by thresholding, improves this second step in an obvious manner.

The first processing can be carried out itself by thresholding (or multithresholding), for example by applying the OTSU or KITTLER-ILLINGWORTH algorithm.

A shape recognition processing can then be applied to each of the morphological layers of the first set of morphological layers. It is thus possible to choose, for each layer, the most suited recognition processing.

Before effecting a shape recognition processing, the method according to the invention allows a first analysis and a separation of the morphological layers from the very start, on the initial image (which will usually be a "raster" image, i.e. an image obtained by means of a scanner of a real image). Thus, according to requirements, there is the advantage, from the very first processing steps, of a separation of the morphological layers.

Because of a morphological classification of the object, affording a high degree of appropriateness of algorithms dedicated to the shapes to be recognised, this method guarantees automation of the processings, associated with reduced parameterising. The result of these processings is a highly structured vectorial document whose natural topology is respected.

Moreover, such a method can be adapted without modification of the parameterising to the variations in representation of the thematics, or morphological layers. The invention makes it possible to identify these different layers, to separate them, and to keep only the layers which are useful for the shape recognition processing.

Finally, the invention is well adapted to the recognition of network drawings (for example telecommunication networks, or water, gas or electricity distribution networks), even if they contain background maps.

The first processing can be followed by a step of refining the area of interest of the image, for example by expansion or erosion, in order to refine the pixel population selection.

This first processing (spatial mask), as well as moreover the first step of classification into different morphological layers of the image, make it possible to separate the "useful" information in a document from the information judged to be purely indicative.

It is possible, after segmentation of the thresholded image, to effect a step of thresholding the parts of the thresholded image corresponding to one of the morphological layers, the image obtained being referred to as the second thresholded image.

The information consisting of the grey levels of the thresholded image, but limited by, or to, one of the morphological layers, which therefore is then itself used as a mask on the thresholded image, is therefore repeated. This information then itself undergoes a thresholding processing, which next makes it possible to improve the segmentation, the latter in its turn making it possible to obtain a second set of morphological layers.

A shape recognition processing can next be applied to each of the layers of the second set of morphological layers.

The invention also relates to a device for implementing an image processing method as described above.

The invention therefore relates to a device for processing the information contained in an image, having:

means for effecting a first processing, making it possible to define an area of interest of the image, means for effecting an adaptive thresholding of the said area of interest, and for obtaining a thresholded image, means of segmenting the thresholded image, in order to obtain a first set of morphological layers of the thresholded image.

In addition means can be provided for applying a shape recognition processing to each of the morphological layers of the first set of morphological layers.

This device can also have means for effecting, after segmentation of the thresholded image, a step of thresholding the parts of the thresholded image corresponding to one of the morphological layers, the image obtained being said to be the second thresholded image.

Another object of the invention is a method of recognising shape in an image, including:

a skeletonisation of the image, in order to establish a skeleton of the elements of the image, a polygonalisation using the pixels of the skeleton of the image, in order to generate segments or bipoints, a structuring of the bipoints, in order to collect together those belonging to the same, shape in the image.

The image to which the shape recognition method is applied can be drawn from one of the sets of morphological layers defined above.

The skeletonisation of the image can include:

a search for the degree of interiority of each pixel, a search for the pixels with the highest degree of interiority.

The polygonalisation step can be followed by a processing for determining the shapes to be recognised at the level of the multiple points. This processing can include the use of first and second skeleton-tracking algorithms:

the first algorithm effecting a line tracking favouring bifurcation to the left in the case of a multiple node, generating a first skeleton tracking, the second algorithm effecting a line tracking favouring a bifurcation to the right in the case of a multiple node, generating a second skeleton tracking.

A step of merging the data resulting from the application of the two skeleton-tracking algorithms can also be provided, in order to eliminate the redundant information contained in the two skeleton trackings. This merging of the data can include for example the determination of the segments, or bipoints, of one of the skeleton trackings, which are included, partially or totally, in the other.

The structuring of the bipoints can include the following steps:

a) establishing a single list of bipoints, in increasing order of length, b) selecting the largest of the bipoints in this last list, c) seeking partial inclusion with the other bipoints, d) testing by polygonalisation, when a partially included bipoint is found during the previous step, e) if the result of step d) is positive, erasing the bipoints, and replacing by the merged bipoint, and returning to c), f) continuing step c), if the result of d) includes more than two points, g) if step d) supplies no more new bipoints, storing the last bipoint issuing from step d), erasing this bipoint from the list of bipoints established at a), and returning to a).

According to another embodiment, the shape recognition method according to the invention also includes a step for assembling the contiguous bipoints in the same segment, the assembling being effected by seeking, step by step, physical continuity, in the very close vicinity of each point of a bipoint to be extended by continuity.

Where the image to which the shape recognition method applies represents technical premises or chambers situated at ends of sections or arcs, the shape recognition method can also include a step of seeking occlusions in the image, a step of filtering the occlusions and a step of seeking the number of ends of sections situated in the vicinity where a chamber was detected.

Finally, another object of the invention is a device for implementing a shape recognition method according to the invention, as described above.

Such a device has;

means for effecting a skeletonisation of the image, in order to establish a skeleton of the image, means for effecting a polygonalisation using the pixels of the skeleton of the image, means for structuring the bipoints and collecting together those belonging to the same shape in the image.

The device can also have means for executing first and second skeleton-tracking algorithms:

the first algorithm effecting a line tracking favouring bifurcation to the left in the case of a multiple node, generating a first skeleton tracking, the second algorithm effecting a line tracking favouring a bifurcation to the right in the case of a multiple node, generating a second skeleton tracking.

The means for executing first and second skeleton-tracking algorithms can also make it possible to merge the data resulting from the execution of the two skeleton-tracking algorithms, in order to eliminate the redundant information containing the two skeleton trackings.

This device can also have the means for collecting together the contiguous bipoints in one and the same segment.

BRIEF DESCRIPTION OF THE FIGURES

In any event, the characteristics and advantages of the invention will emerge more clearly in the light of the following description. This description relates to the example embodiments given for explanation and non-limitatively, with reference to the accompanying drawings, in which.

DETAILED DESCRIPTION OF EMBODIMENTS OF THE INVENTION

Figure 1A:
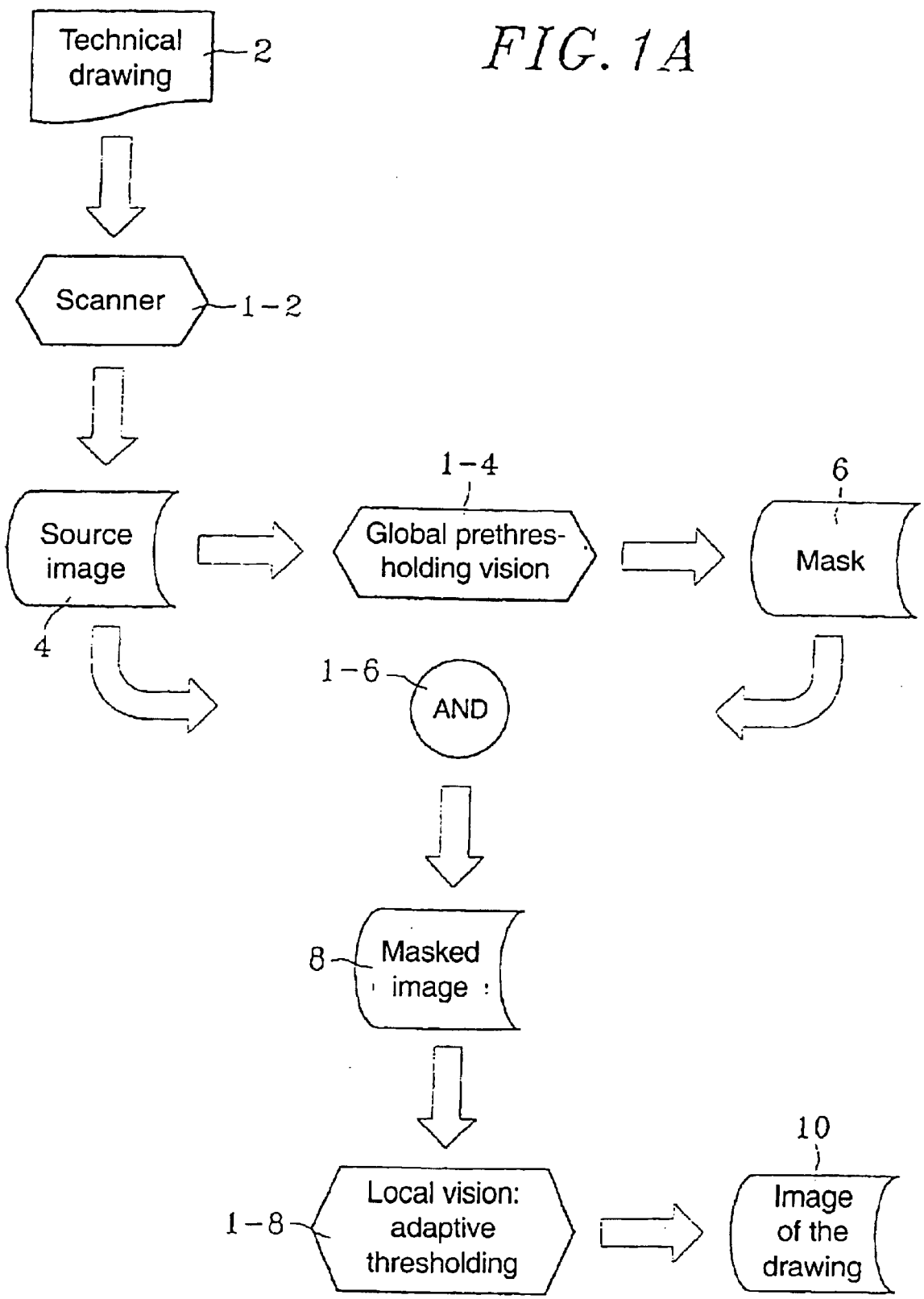
FIGS. 1A and 1B depict schematically the steps of a method according to the invention.
Figure 1B:
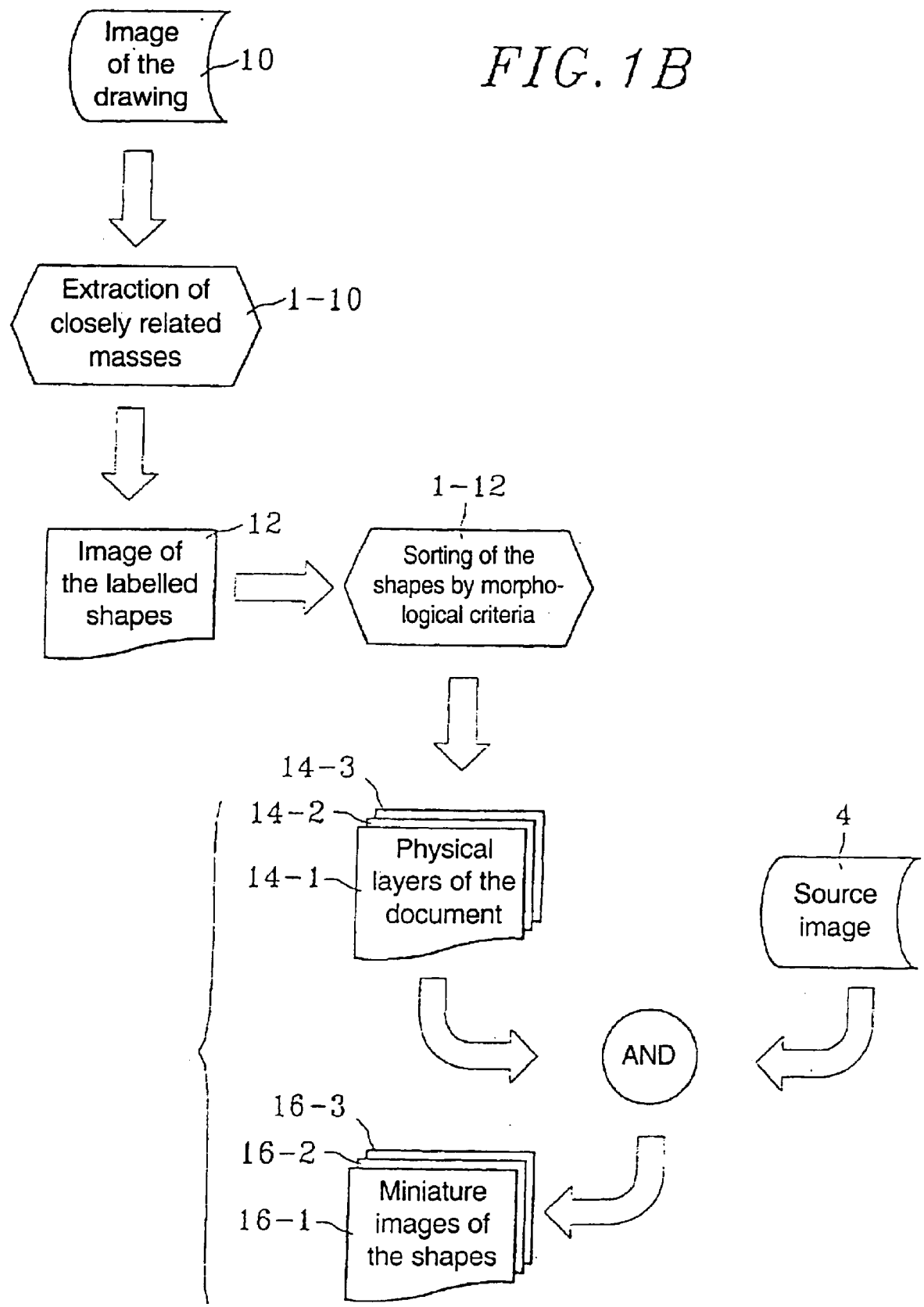

FIGS. 1A and 1B depict steps of a method which can be implemented in accordance with the invention.

A technical document 2 (FIG. 1A) is first of all "scanned" (or sampled, steps 1–2), for example in an 8-bit format, and at high resolution, for example greater than 400 dpi. This step therefore supplies a source image 4.

To this source image, a first processing 1-4 will be applied, for defining an area of interest of the image. This first step (also referred to as a global approach step) can be implemented, for example, by thresholding, the threshold level or levels applied being determined by a thresholding algorithm from the histogram of the grey level of the source image. This thresholding makes it possible to define different classes (at least two) of grey levels in the histogram of the image. For example, at least one of these classes corresponds to the background of the image and is not retained: the mode of the background is therefore reduced to 0 in the source image. From this operation, a mask 6 can therefore be derived, which makes it possible to define an area of interest of the image.

The masked image 8 is obtained by applying (1-6) the mask to the source image 4. This masked image therefore no longer contains any more than the elements of the document which are chosen as being significant.

A local processing (local approximation) of the image is next performed: the masked image will undergo an adaptive thresholding (step 1-8) using a thresholding algorithm. A so-called "thresholded" image 10 is thus obtained. The thresholding operation performed on the masked image is much more effective, or much more precise, than the one which would have been performed directly on the source image 4. In particular, it is possible to obtain, by virtue of this method, the differentiation of certain details of the image, which would have been merged if thresholding had been carried out directly on the source image.

An operation of extracting the masses of related pixels is then carried out (FIG. 1B, step 1-10). In this way images 12 are produced, each image representing similar masses, or shapes, of pixels.

These shapes are next sorted (step 1-12) by morphological criteria. The operation consisting of "labelling" the shapes and classifying them in accordance with morphological criteria is referred to as a segmentation operation. In this way the definition of physical "layers" 14-1, 14-2, 14-3, of the document is obtained. Sorting the shapes according to their morphology next makes it possible to subject them to dedicated recognition algorithms, adapted to each of the shapes.

Each of the different physical layers thus defined can be considered in its turn as a mask for the source image 4. Applying these masks to the source image makes it possible to obtain small images 16-1, 16-2, 16-3, ... to the format of the source image (here B bits). Each physical layer therefore makes it possible to find the information which corresponds to it, in terms of grey level, in the source image.

Each of the images 16-1, 16-2, 16-3, ... can in its turn be subjected to processing by thresholding, in order to improve the segmentation of the image. Once the new thresholds have been determined on one of the images 16-i, a new cycle can be recommenced with this image 16-i: this image can be resegmented by the size of the closely related masks. It is thus possible to separate the shapes (or characters) which, on the technical drawing 2, were disconnected or separate, but which appeared to be connected in the source image 4.

Figure 2:
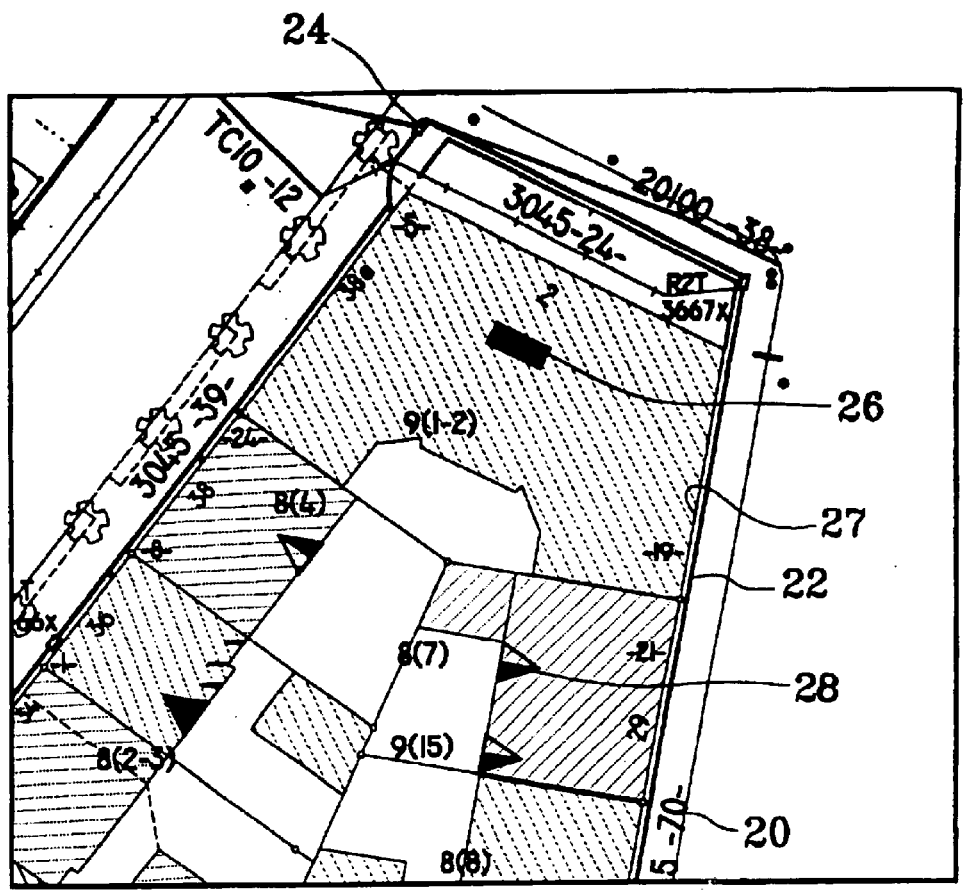
FIG. 2 is an example of a document to be recognised.
Figure 3:
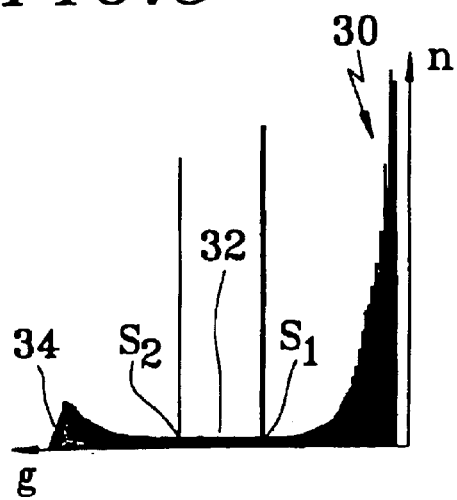
FIG. 3 is a histogram of the document of FIG. 2.

FIG. 2 is a characteristic example of the type of document to be recognised. The elements to be extracted have been marked, those which derive the route of a telephone network. Thus there are found characters 20, network sections 22, chambers 24 (the cable chambers), a building terminal 26, the concentration points (CP) 28 (boxes enabling a user to be connected to a network) or edges of plots 27. An examination of this image in terms of grey level shows a strong background noise, due to the quality of the medium and the high degree of connectedness of the elements to be extracted with the background of the cartographic drawing. The description of the histogram of this image, depicted in FIG. 3, shows these characteristics.

This histogram includes essentially three regions:
- a first region 30 (or "high mode"), which contains solely the background of the image,
- a central region 32, which contains mainly cadastral information,
- a third region 34 (or "low mode"), which contains mainly the information relating to the telephone network.

In a first approximation of the image, referred to as the global approximation, the area of interest encompassing the network is determined. For this purpose, an adaptive multithresholding is carried out; this is a case of multithresholding in three classes, based on the OTSU algorithm. The vertical axes indicate the threshold values $S_1$, $S_2$ calculated by the algorithm from the histogram.

Figure 4:
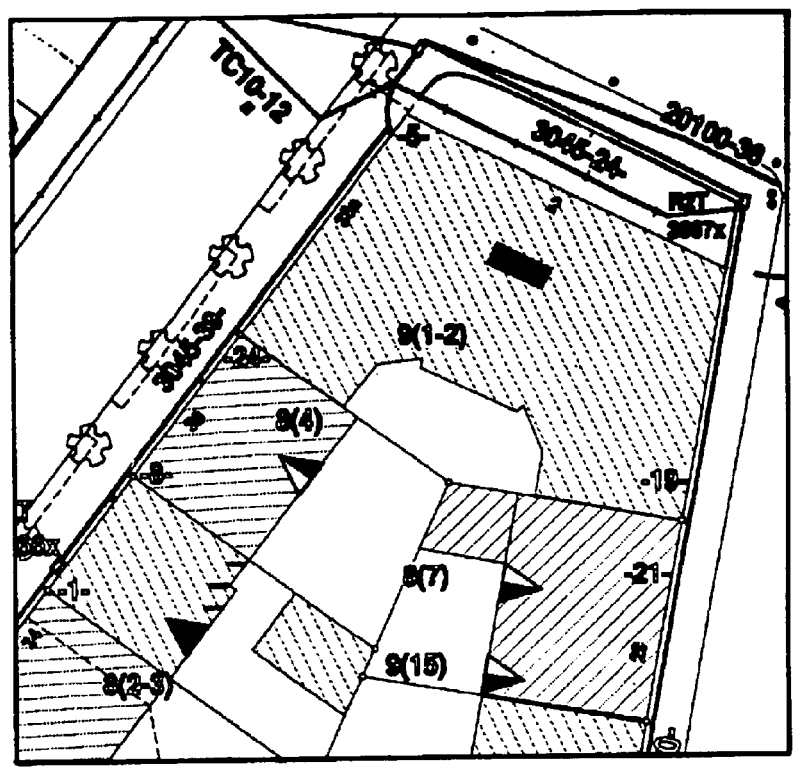
FIG. 4 depicts the image obtained, after masking of the document.

A colour can be allocated to the pixels of each of the three classes, and the spatial distribution of these classes (FIG. 4) can be determined.

It will be observed that the network fits entirely within the class depicted in grey in the image. However, the noise remains very great and it is not possible to present this class directly to a recognition system. On the other hand, this class corresponds to the spatial extent of the initial image containing the network.

By virtue of the global approximation of the image, an area of interest corresponding to the spatial extent in which the network entirely fits has therefore been isolated. This area is the result of a multithresholding based on seeking the characteristic modes of the histogram. Starting from the principle that the network is included in this class, a masking of the initial image is effected in order to eliminate the pixels of the background. It is by selecting the classes that the spatial mask is selected.

Figure 5:
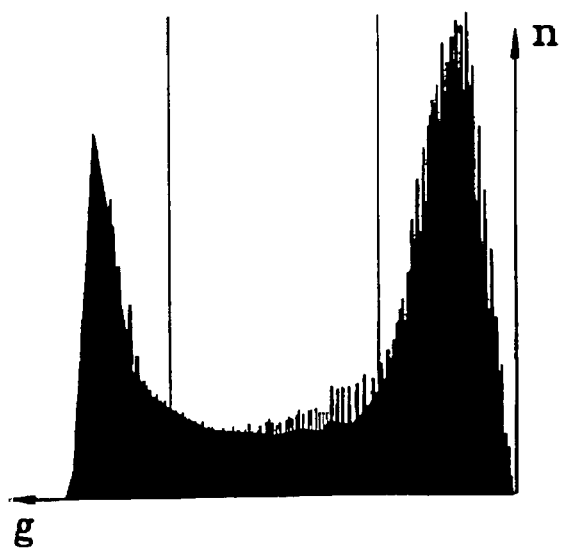
FIG. 5 is a histogram of the image depicted in FIG. 4.

The image obtained is a "division" of the image into grey levels g whose histogram is given in FIG. 5. The discrimination of the modes is appreciably improved therein, because of the exclusion of the population of the background pixels on the image. As from now, the processing chain no longer uses any more than the significant elements of the document.

Several thresholding algorithms have been used (OTSU, KITTLER-ILLINGWORTH and a spectral classifier, ISODATA, described in the software IMAGINE from ERDAS). The results obtained have shown that the return to the source image, in order to use only a significant population of pixels, clearly optimises the functioning of the different thresholding processings.

In addition, in the constitution of the mask, it is possible to use conventional mathematical morphology operators, which are easier to produce (expansion or erosion of images), in order to refine the population selection.

Figure 6:
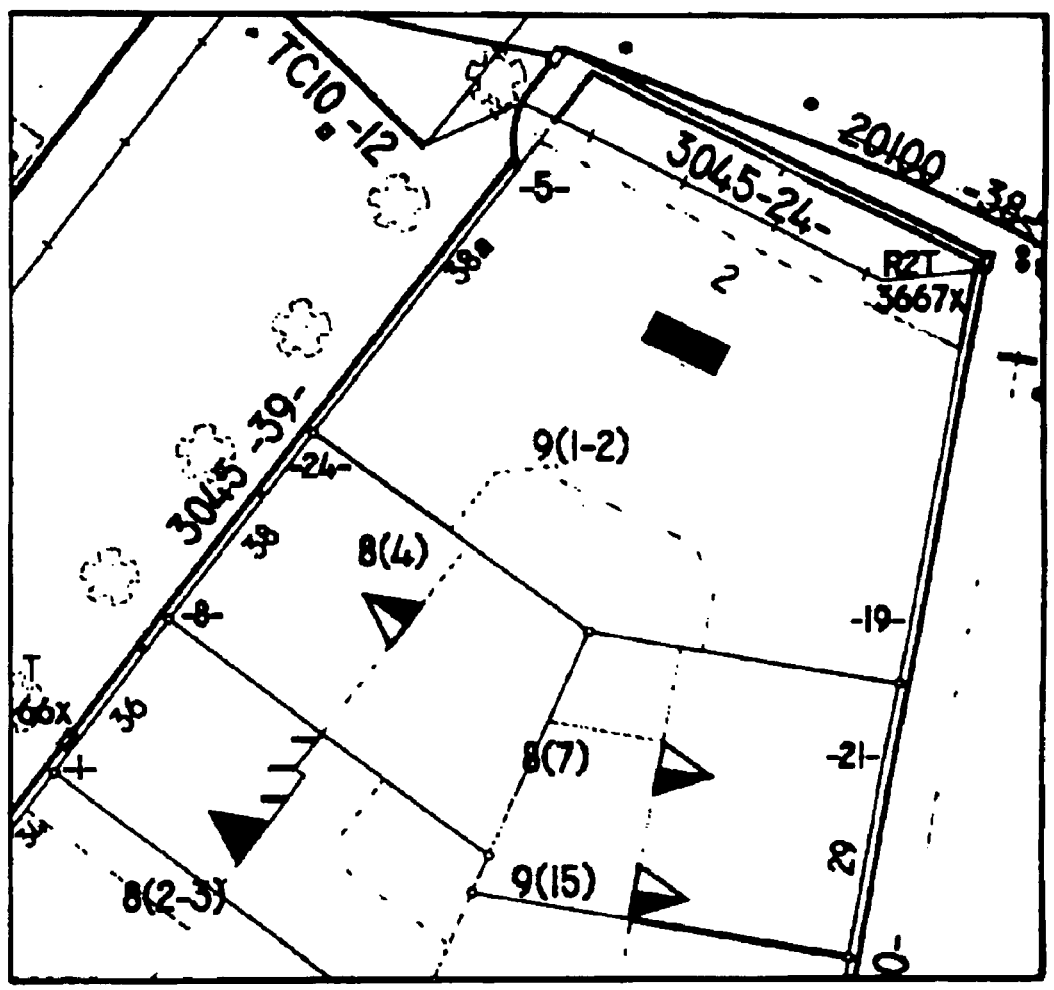
FIG. 6 depicts the image obtained, after adaptive thresholding of the image depicted in FIG. 4.

Finally, an area of interest has been constructed on which a segmentation of the shapes of the image (FIG. 6) can be carried out.

It can be seen in this figure that the majority of the information of the cartographic background has been eliminated; this is the case, notably, with the hatching of buildings, which are strong disturbing elements in vectorisation. This information is not necessarily lost since it is discriminated by the choice of classes in the thresholded image.

This thresholded image will next be segmented.

Figure 7A:
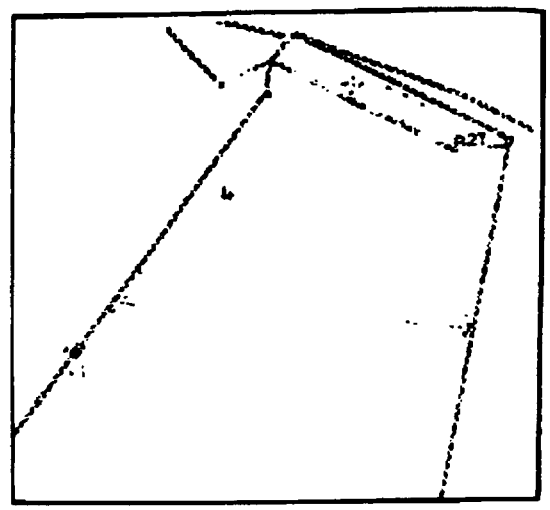
FIGS. 7A to 7C depict three morphological layers obtained by segmentation of the image depicted in FIG. 6.
Figure 7B:
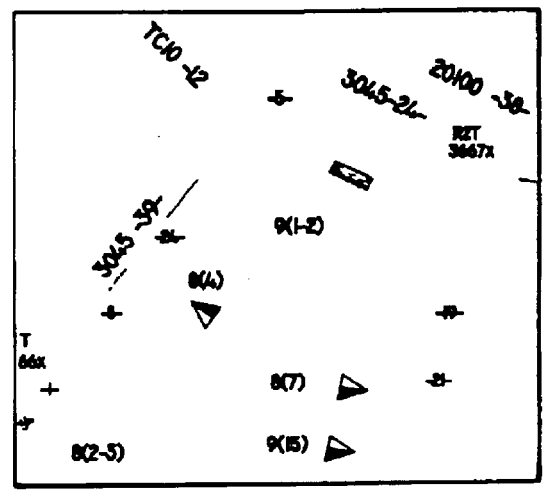
Figure 7C:
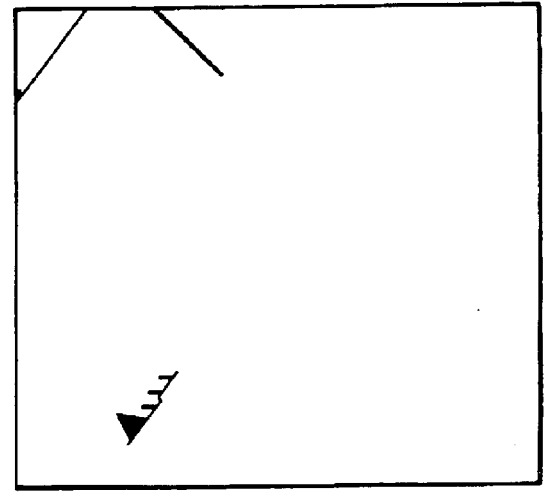

The segmentation operation consists of labelling the shapes present, and classifying them according to morphological criteria. Each of the labelled shapes constitutes a related mass of pixels. In our prototype, this segmentation consists of determining three classes of shapes:

three major linear elements, containing mainly the conduits (main cable sections in the network) and the cable chambers (FIG. 7A), shapes corresponding to the terminal equipment of the network (CP, whose symbology is here represented by triangles or rectangles) and to the characters (FIG. 7B), shapes whose morphology does not come within any of the above criteria (FIG. 7C).

These three layers constitute a physical model of the document. Sorting the shapes according to their morphology will make it possible to subject them to dedicated recognition algorithms adapted to each of the shapes.

Each layer contains the majority of the elements to be recognised. Hereinafter, attention will be paid, through the recognition of shapes (see below), to studying the layers, notably those containing the sections of main cables (FIG. 7A).

The three layers can be considered to be a set of masks on objects of the same class. It is therefore possible, using these masks, to find the information in terms of grey levels concerning a single class. The grey-level image generated from different masks can thus be rethresholded, in order to improve the segmentation of the image. This is because, by reducing the number of types of information in the image, the determination of automatic thresholds will be more pertinent.

Once the new thresholds have been determined, a new cycle recommences with this new image. This new image is resegmented by the size of the closely related masses.

The results are entirely satisfactory. The majority of the characters connected have been disconnected. The only ones which still remain connected are also connected on the original image. They can therefore not be segmented at this level of processing. Finally, each of the layers thus obtained is presented to the shape recognition process by allowing the use of algorithms which are best suited to the physical thematics proposed.

The thresholding algorithms used can for example implement the OTSU method, or that of KITTLER-ILLINGWORTH.

The OTSU method ("A threshold selection method from grey level hystograms", IEEE Trans. Syst. Man Cyber, 1, p. 62–66, 1979) assimilates the problem of determining a pertinent threshold T, for the binarisation of the image, to a problem of better classification of the pixels into two subgroups $C_{1T}$ and $C_{2T}$.

One of these classes always contains the background, and the other the objects of the image.

The histogram of the image, for a grey level t, makes it possible to calculate the statistical data seen previously: a priori probability of belonging, mean grey level, and variance for each class $C_1$ and $C_2$. OTSU deduced therefrom the following equations:

mean grey level for the entire image:

$$g_T = \sum_{g=0}^{L} g \cdot p(g) = \sum_{j=1.2} \omega j(t) \cdot gj(t)$$

variance for the entire image:

$$\sigma^2(t) = \sum_{g=0}^{L} (g - g_T)^2 \cdot p(g) = \sigma^2 w(t) + \sigma^2 B(t)$$

with:

$$\sigma^2 w(t) = \sum_{j=1.2} \omega j(t) \cdot \sigma^2 j(t)$$

referred to as intra-class variance, $$\sigma^2 B(t) = \sum_{j=1.2} \omega j(t) \cdot (gj(t) - g_T)^2$$

referred to as inter-class variance.

OTSU introduces the following discrimination criterion, dependent on t, which will have to be maximised:

$$\eta(t) = \frac{\sigma^2 B(t)}{\sigma^2 T}$$

This ratio represents the pertinence of the choice of threshold t for binarising the image. This is because, whatever the total variance of the image, an optimum threshold results in a maximum value of the variance between the class corresponding to the background and that corresponding to the objects $\sigma^2 B(t)$.

Therefore, if t is optimum, and σ, the variance for the entire image, does not depend on t, □(t) reaches its maximum. The evaluation of □(t) requires the prior calculation of a $\sigma^2 B(t)$ and of $\sigma^2 T$. Instead of using □(t) for seeking the optimum threshold, it is possible to use the fact that: $\sigma^2 T = \sigma^2_w(t) + \sigma^2_B(t)$ is a constant for any t.

However, for T, optimum threshold, there is a maximum $\sigma^2 B(t)$, i.e. a minimum $\sigma^2_w(t)$.

Consequently, classifying according to this first IU method amounts to finding the boundary which on the one hand maximises the inter-class variance so as to is separate the classes and on the other hand minimises the intra-class variance so as to group together the grey levels of each class around its mean.

In the method of KITTLER and ILLINGWORTH (Kittler et al., "Minimum error thresholding", Pattern Recognition, 25(9), p. 963–973, 1992), the initial hypothesis is that the populations $C_1$ and $C_2$ associated with the background and object follow Gaussian distributions.

Let T be the Gaussian model change threshold given a priori, and let h(g) be the histogram of the image; then it is possible to define the parameters of each population Ci(I= 1.2):

$$\omega i(T), gi(T) \text{ and } \sigma^2 i(T)$$

Let h(g/i,T) be the approximate law of h(g), conditionally upon the population i and the threshold T. For a grey level g in [0, L], the conditional probability is defined for g being replaced in the image by a correct value, after binarisation, when T is chosen by:

$$e(g, T) = \frac{h(g/i, T) \cdot \omega i(T)}{h(g)} \text{ where } i = \begin{cases} 1 \text{ if } g \leq T \\ 2 \text{ if } g > T \end{cases}$$

Noting:

$$\epsilon(g, T) = -2 \log(h(g).e(g, T)) = -2 \log(h, g/i, T.\omega i(T)) \quad (4)$$

However, by hypothesis:

$$h(g/i, T) = \frac{1}{\sqrt{2\pi\sigma i(T)}} \exp\left(-\left[\frac{(x - gi(T))^2}{2\sigma^2 i(T)}\right]\right) \text{ for } i = 1.2 \quad (5)$$

Combining (4) and (5), there is deduced:

$$\epsilon(g, T) = 2\log\sqrt{2\pi} + 2\log \sigma i(T) + \left[\frac{g - gi(T)}{\sigma i(T)}\right]^2 - 2\log \omega i(T) \quad (6)$$

The only concern is with the non-constant part, given by:

$$\epsilon'(g, T) = \epsilon(g, T) - 2 \log \sqrt{2\pi} \quad (7)$$

$\epsilon'(g, T)$ is an indicator of the correct classification of g. The smaller it is, the better will be T for the classification of this pixel.

In order to evaluate the thresholding quality obtained for a given value of T, KITTLER & ILLINGWORTH define the following criterion:

$$J(T) = \sum_g h(g) \cdot \epsilon'(g, T) \quad (8)$$

The optimum threshold T* for the binarisation of the image will be given by: $J(T^*) = \min_T J(T)$.

There is also obtained:

$$J(T) = \sum_{g=0}^{T} h(g) \cdot \left[2\log\sigma_1(T) - 2\log \omega_1(T) + \left(\frac{g - g_1(T)}{\sigma_1(T)}\right)^2\right] + \sum_{g=T+1}^{L} h(g) \cdot \left[2\log\sigma_2(T) - 2\log \omega_2(T) + \left(\frac{g - g_2(T)}{\sigma_2(T)}\right)^2\right] \quad (9)$$

Starting from (9) and considering (1), (2) and (5), the following formulation of the KITTLER & ILLINGWORTH criterion is arrived at:

$$J(T) = 1 + 2[\omega_1(T)\log \sigma_1(T) + \omega_2(T)\log \sigma_2(T) - 2[\omega_1(T)\log \omega_1(T) + \omega_2(T)\log \omega_2(T)] \quad (10)$$

In order to determine the optimum threshold, it suffices to seek T such that J(T) is minimum.

These methods can be extended to multithresholding. This is of interest in certain cases, in particular in the one disclosed above. This is because the histograms given as an example have two modes, and a broad undefined region between the two. It therefore appears legitimate to wish to seek three classes, i.e. one for each mode, and a last one for the undefined region, whence the necessity to find two thresholds. This is parameter chosen a priori. Choosing more than two thresholds could also be advantageous in certain cases.

In the method described above, a technical document is first of all scanned by means of a suitable device of the scanner type. Original images are thus obtained, which can be stored in the form of digital images.

The image processing method according to the invention can be implemented by means of a Unix or Windows workstation. This station can work independently of the scanner whose images were previously stored. The data processing program according to the invention can be stored on magnetic tapes or on one or more diskettes. The programs are developed under Unix in ANSI-compatible C language and can be carried on different UNIX/Motif workstations or a microcomputer of the PC type under Windows NT4. The workstation can also incorporate a display device.

The computer system used has a calculation section with a microprocessor and all the electronic components necessary for processing the images.

Figure 8:
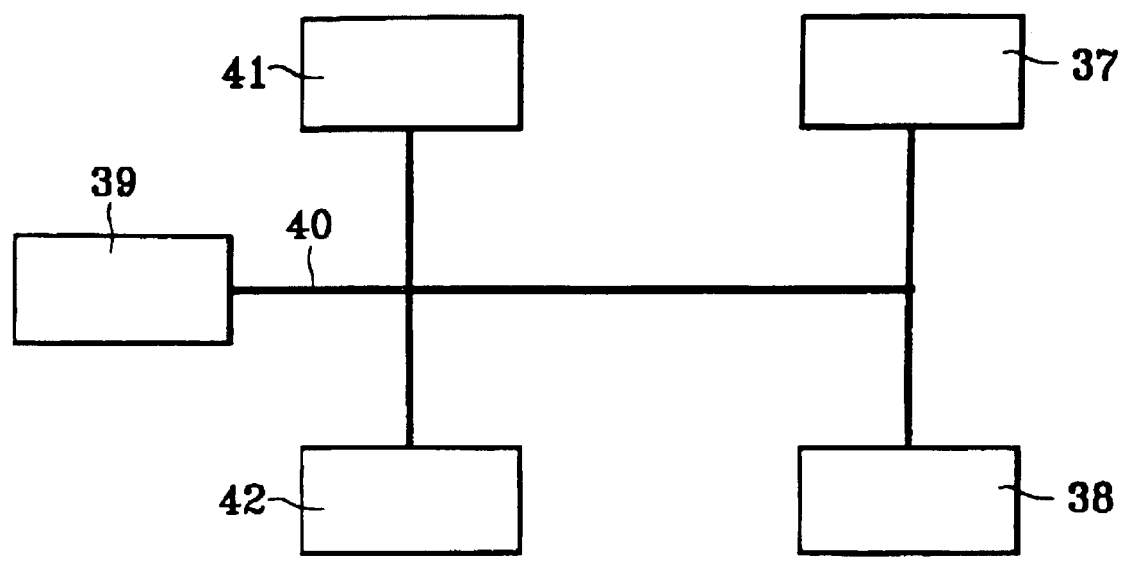
FIG. 8 depicts a device for implementing the present invention.

FIG. 8 is a simplified representation, in block form, of one of the components of the computer used. A microprocessor 39 is connected, by a bus 40, to RAM memories 41 for storing the data and program instructions, and an ROM memory 42 for storing the instructions of the processing program produced. A computer having these elements can also have other peripheral elements such as the scanner or display device mentioned above or a mouse, modem, etc. Data on images to be processed or on programs to be applied can be transferred to the RAM memory 41 from storage or memory media such as disk, CD ROM, magneto-optical disks, hard disks, etc. A keyboard 38 makes it possible to enter instructions into the device.

In general terms an apparatus or device according to the invention, for processing information contained in an image, has:

storage means for storing instructions for processing the information contained in the image, a processor connected to the storage means, which effects the instructions of:

first processing for defining an area of interest of the image, effecting an adaptive thresholding of the area of interest, in order to obtain a thresholded image of this area of interest, referred to as the first thresholded image, segmentation of the thresholded image, in order to obtain a first set of morphological layers of the thresholded image.

Other instructions can relate to other steps or other embodiments of the method according to the invention as described above.

The device or system described above uses a program for a computer, resident on a medium which can be read by a computer and containing the instructions enabling a computer to implement the method of processing information contained in an image according to the invention, i.e.:

effecting a first processing, for defining an area of interest of the image, effecting an adaptive thresholding of this area of interest in order to obtain a thresholded image of this area of interest, referred to as the first thresholded image, segmenting the thresholded image, in order to obtain a first set of morphological layers of the thresholded image.

Other instructions can be provided, which correspond to various embodiments or to particular steps of the information processing method as described above.

The method according to the invention can also be implemented according to a "component" or "hard" version.

The skeletonisation method (vectorisation algorithms) supplements the work of B. Taconet (TAC90) described in "Two skeletonisation algorithms", Transactions of the RAE Colloquium, Le Havre, BIGRE 68, p. 68–76, 1990. One of the advantages of this algorithm is its relative insensitivity to noise. In addition, this algorithm is effective in terms of processing time. The labelling of the elements as a function of their degree of interiority in the line is also a not insignificant asset, whose usefulness will be disclosed a little later. This is because the skeleton issuing from this method is in fact a standardised image whose pixels are labelled according to their degree of interiority in the shape. The measurement of the thickness of the lines is thus directly accessible by virtue of this labelling.

This algorithm includes a step of seeking the degree of interiority of each pixel, and then a step of seeking the pixels with the highest degree of interiority.

1. Seeking the Degree of Interiority of Each Pixel

The first step consists in labelling the pixels according to their degree of interiority in the shape. It is broken down into two successive passes over the image. Each passage corresponds to the application of an L-shaped mask which makes it possible to label the pixels according to their degree of interiority. The first L-shaped mask is applied to the image, passing over it from top to bottom. Each pixel P of the object is labelled according to the following mask (first mask for the construction of the image of the degrees of interiority):

|    | P  | P1 |
|----|----|----|
| P4 | P3 | P2 |

P is then labelled according to its surroundings, in accordance with the following rule: $P_0$=lower(P1+1, P2+1, P3+1, P4+1).

The second scanning is effected from the bottom to the top of the image. The mask applied is as follows (second mask for the construction of the image of the degrees of interiority):

| P6 | P7 | P8 |
|----|----|----|
| P5 | P  |    |

P is then labelled according to its surroundings, in accordance with the following rule: $P_1$=lower(P5+1, P6+1, P7+1, P8+1).

The degree of interiority adopted for each pixel P is the largest value of $P_0$ and $P_1$ (higher($P_0$, $P_1$)).

Pixels with the highest degree of interiority correspond to the points on the skeleton. The skeleton is obtained by seeking all these points with the maximum label.

2. Formation of the Core Image: Seeking the Pixels with the Highest Degree of Interiority This second step consists in extracting the significant points of the skeleton, constructing a "core" image from the image of the degrees of interiority. The core image is in fact an image where the thickness of the lines is at most equal to two. It is calculated using twelve 3×3 masks. The twelve masks are obtained by rotating the three masks illustrated below about the central pixel marked P(P=current point, C=contour point, X=point on the background or the internal mass):

| XCX | XCX | XCX |
|-----|-----|-----|
| CPC | XPC | XPX |
| XXX | CXX | CXC |

At each iteration, the processed pixels are those whose degree of interiority is equal to the order of the current iteration as well as those, with lower degrees, which were kept during the previous steps.

The refinement of the core image according to the surrounding conditions expressed by the 16 masks obtained by rotating the other masks (below) finally makes it possible to obtain the skeleton.

| X0X | 000 | 000 | X00 |
|-----|-----|-----|-----|
| 1P1 | X11 | 11X | 1P0 |
| X1X | X11 | 11X | X1X |

Since the process of skeletonisation does not afford any structuring of the information, a monitoring of the skeleton is then effected which will make it possible to effect this structuring.

The shape recognition method according to the invention will be explained in application to linear objects (a network and its different sections). It can be implemented on other types of objects.

From the skeleton determined above, a skeleton tracking makes it possible to construct a graph corresponding to the linear objects processed. The recognition of the network results from this reconstruction. At the end of this processing, the information is structured in the form of a graph connecting all the nodes of the image.

In order to effect the reconstruction of the network, a polygonalisation tool is available: such a tool makes it possible to generate segments from points. An example of such a tool is described in the doctoral thesis of the University of Rouen (1994) by J. M. Ogier entitled "Contribution to the automatic analysis of cartographic documents: interpretation of cadastral data".

There are also available lists of points with different structures. This is because, if there are multiple points on the skeleton, there may be different possibilities of pursuing the processing. Thus two lists of tracking results are formed, and the data are merged in order to obtain a tracking of the line best meeting the topology of the shape to be reconstructed.

There is also available information on the thickness of the original lines: it is in fact a case of the information (the degree of interiority) resulting from the algorithm described above.

Finally, there is the image on which the work has been carried out, i.e. here the morphological layer concerned (resulting from the segmentation operation) and the original image. The morphological layer concerned will in general be the one corresponding to the elements, or objects, here linear.

In addition, whenever the application or occupation concerned (recognition of a telecommunication network drawing, or of a water or gas distribution network, or of an electrical distribution network), there are rules imposed by the industry itself. In particular the telecommunication cable lines, or sections, connect the cable chambers, the water pipes connect the water distribution points, the electrical lines connect the branch boxes, etc. Generically, the arcs of the network connect the nodes of this network. At the nodes of the network there may be "chambers".

In the field of telecommunications, the model of the France Telecom network teaches that an arterial section is delimited by two, and only two, infrastructure nodes. An infrastructure node may be a chamber, a simple node or a support on a facade. In addition, an unlimited number of arterial sections may start from an infrastructure node.

In more general terms, the rules of organisation of the data of a theme, of whatever nature, supply information useful to the recognition of a document. This modelling is related to the industry which led to producing this document. It is therefore possible to define, in a recognition chain, "industry-oriented modules" which are well delimited, in order to make it possible, on the assumption of a reuse of the method, to modify only part of the system, and to preserve its generic parts.

The reconstruction of the network makes it possible to fabricate lines, or arcs, from the skeleton (all the pixels of the skeleton). Manufacturing these lines, or arcs, results from the application of the industry rules to the data of the skeleton.

The reconstruction of objects uses different information primitive, for example:
  the model of the data, which affords the information related to the industry,
  the segmentation primitives (bipoints) which constitute the base elements of the objects to be known,
  information issuing from objects recognised in other morphological layers (the cable "chambers" in the case of telecommunications).

Polygonalisation makes it possible to produce arcs (in fact bipoints, or segments).

Figure 9:
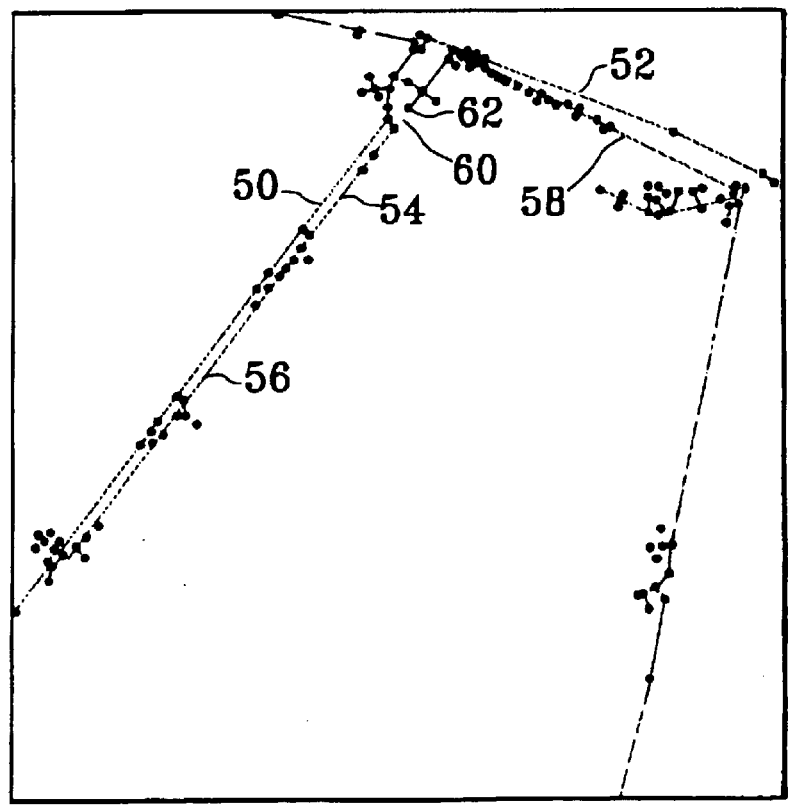
FIG. 9 is an example of a result of polygonalisation.

A polygonalised itinerary corresponding to the example already given above (in relation to FIGS. 2 to 7) is given in FIG. 9. All the articulation (or reversal) points, as well as the start and end points of the segments, are represented by spheres.

In this figure, there can be seen, amongst the segments, those which correspond to elements of the network 50, 52 and those which correspond to the edges of the plots 54, 56, 58.

A major part of the elements of the network consist of long linear objects. The plot edges which have remained do however have not insignificant lengths.

These linear elements constitute a first primitive on which it is possible to rely in order to produce an outline of the network, consisting of large segments, and in which the only thing left would be to identify the missing elements. Such missing elements are, for example, marked in FIG. 9 by the references 60, 62.

A second primitive is based on the thickness of the lines. It constitutes a primitive which is broadly discriminating between the network and the plot edges.

For this purpose a threshold is defined. A threshold on the average of the degree of interiority in the image does not appear to give a generic result. At this stage, its definition remains manual.

At the multiple points of the skeleton, there may be different possibilities of pursuing this processing. Thus, two lists of tracking results are produced, and the data are merged in order to obtain a line tracking best meeting the topology of the shape to be reconstructed.

For the reconstruction, two skeleton tracking algorithms are therefore used, each of them generating a list of objects.

The first (or respectively the second) algorithm effects a line tracking, favouring, in the case of any doubt, a bifurcation to the left (or respectively to the right) in the case of a multiple node.

Figure 10A:
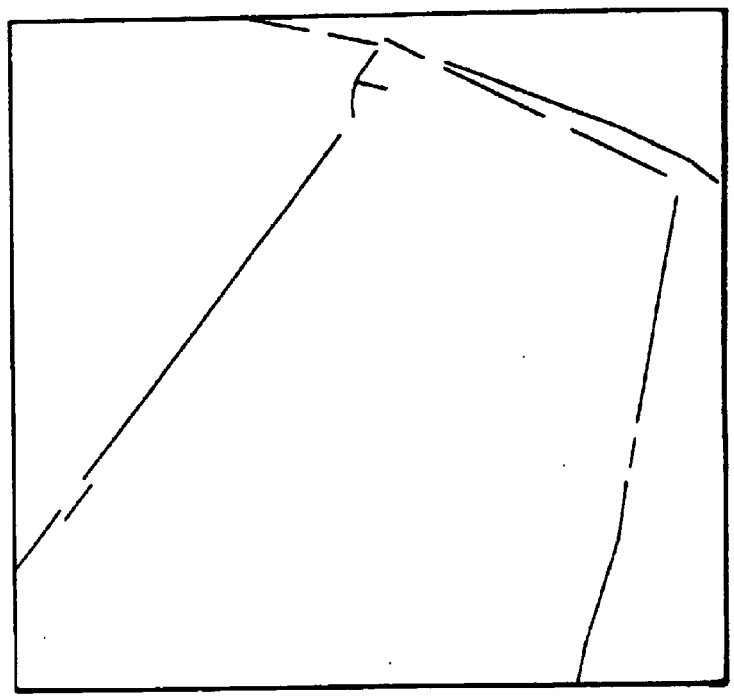
FIGS. 10A and 10B are examples of a result of a skeleton-tracking algorithm, respectively trigonometric and anti-trigonometric.
Figure 10B:
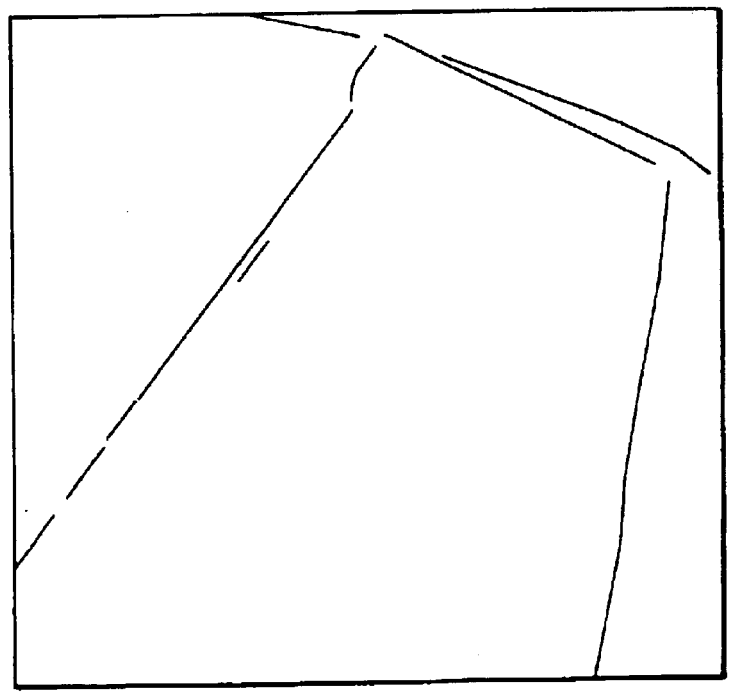

To pick up the example of FIG. 9, the application of these two algorithms results in the trigonometric and anti-trigonometric tracking depicted in FIGS. 10A and 10B.

There are therefore obtained two lists of segments structuring the information so that the network is represented therein in a relatively continuous manner. In order to exploit these two lists to the maximum extent and to find the entire continuity of a section between two nodes, the data are merged, which reveals the long straight objects, since they will each be represented by two relatively distant points.

It is also possible to select these data, i.e. the bipoints, in order to segment the information present in the two lists.

In addition, if a selection is made on the long objects, there is more chance of keeping only the network elements of the "section" type, excluding part of the plot edges and almost all the barbs. This is because the threshold used for effecting the polygonalisation is the thickness of the original line. Thus the plot edges which are finer lines have more chance of being divided up by the polygonalisation. Nevertheless, by this selection, the elements constituting the chambers are also excluded.

The threshold as from which it is possible to use the term "long object" is not precisely fixed. It is possible to use a threshold of approximately 120 pixels, which corresponds to a length on the paper drawing of approximately 0.6 mm (resolution of 400 dpi). The processings are little sensitive to the fluctuation of this threshold, and thus a manual determination seems suitable. On the few tests carried out, this threshold has always appeared suitable, without having to be modified.

The merging of data makes it possible to eliminate the redundancy which exists in each list issued from the two different trackings, whilst making it possible to complete the information on the long objects in one list, with respect to the other. At the end of this processing, there will remain no more than a list reduced to the maximum extent, reconstituting the major part of the section of the network.

One problem posed by this merging is that the segments issuing from the polygonalisation do not overlap totally. This problem stems from the fact that the starting node and end node are different for the two trackings. Thus, after polygonalisation, the same paths are not exactly obtained. They are nevertheless very close since they both belong to the morphological layer of the sections of the network.

It is therefore attempted to sort and connect together these two segments in order to obtain a description of all the sections of the network which is as complete as possible.

The sorting consists in eliminating, from one list, the bipoints which are included in the other.

For this purpose, an inclusion criterion is defined which makes it possible to determine whether a bipoint is close to another.

Figure 11:
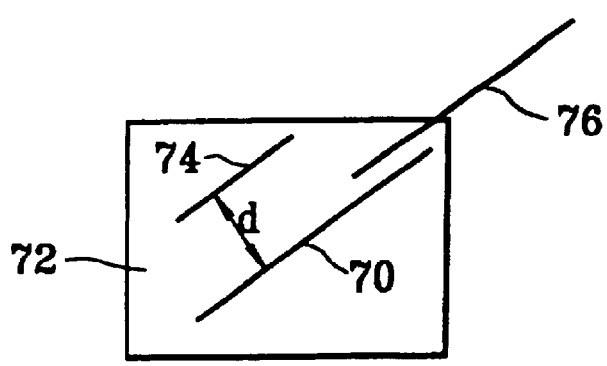
FIG. 11 illustrates the principle of inclusion.

In order to define the inclusion, two steps are carried out. The first step (FIG. 11) consists of the delimitation of a region inside which a source bipoint 70 is situated. A region 72 which is the rectangle encompassing the bipoint is then delimited; this can be enlarged in height and width, for example, by twice the degree of interiority of the segment from which it came. Thus bipoints 74, 76 are sought which would be included in this region. This is the first inclusion criterion.

The second inclusion criterion consists in measuring, for each previously selected bipoint 74, the distance d which exists with the straight line formed by the source bipoint 70. The distance calculated is that of the orthogonal projection of a point on a straight line, for the two points which make up each bipoint. If this distance is less than a threshold for the two points of a bipoint, it is then considered that there is total inclusion. The threshold is for example equal to the degree of interiority, which makes it possible to obtain very good results.

Partial inclusion is also defined, which consists in detecting a single point of a bipoint included in a source bipoint.

The above processings will be effected not by reading on the image, but directly from the information issuing from the lists.

From the elements thus defined, the redundant information is eliminated. For this purpose, a source list is arbitrarily chosen with which the inclusion criterion, defined above, can be evaluated with the other list.

Any bipoint included completely in a source bipoint can be eliminated.

Following this processing, the role of these two lists is reversed and the process is reinitiated.

All that remain then are partial inclusions between the bipoints in the two lists.

The partially included bipoints can also be merged.

Figure 12:
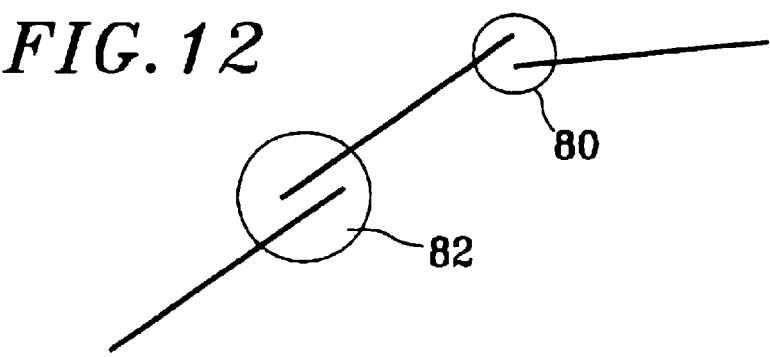
FIG. 12 depicts possible configurations between bipoints.

There are various types of possible configurations, two main cases 80, 82 of which are depicted in FIG. 12. The reference 80 designates a case of non-colinear bipoints and the reference 82 a case of colinear bipoints.

According to this figure, it is advantageous to merge two colinear bipoints into a single bipoint.

This is because these two bipoints then express the same section part. This partial redundancy can therefore be eliminated. However, two non-colinear segments are not merged.

One of the difficulties lies in determining the colinearity. This is because it is possible to find two segments very close together, and almost colinear, without their actually being so.

This difficulty is got round by the use of a polygonalisation algorithm such as the one already implemented previously. This is because, if the coordinates of the two bipoints to be merged are put through the polygonalisation function, with the degree of interiority as a maximum error, the result will be a single bipoint if the two starting bipoints are actually colinear and come from the same section.

In order to perform the final merging operation, two distinct lists are no longer worked on, but rather a single list containing the previous two lists. This makes it possible to optimise the choice of bipoints. This is because working on two lists amounts to seeking the continuity of a bipoint of one list in the other list, which is not necessarily the most judicious solution.

Thus, following a bipoint, it is possible to find two other candidate bipoints (one on each list). The is best choice is considered to be the longest bipoint. It therefore suffices to make only one list and to order it in increasing order of length. In this way, the order of testing the bipoints will establish the required priority.

Therefore all the bipoints are placed in a single segment (source list), and then they are classified by increasing order of length.

A first bipoint (the largest) is taken and partial inclusion with the other bipoints is sought. When a bipoint partially included in the largest bipoint is found, the two bipoints are tested by polygonalisation.

This phase uses the knowledge of the order in which the points follow on from each other in order to constitute a single bipoint. This is because the polygonalisation algorithm uses the knowledge of the two end points of the set of bipoints to be processed. It is therefore sought to know the position of the different points with respect to each other:

if the result of this processing is a bipoint, then the two bipoints have been correctly merged. In this light, the two bipoints in the source list are erased. A new partial inclusion search is then initiated from the new bipoint thus created, and the cycle recommences, if the result of the polygonalisation includes more than two points, the alignment of the two bipoints is not in conformity. The partial inclusion search then continues.

When the partial inclusion search no longer supplies any new bipoints, the bipoint issuing from this processing is placed in a result list (storage in memory). If no modification has been made to this bipoint during the processing, it is erased from the source list.

The largest of the bipoints which remains in the source list is then used for reinitiating the processing.

Figure 13:
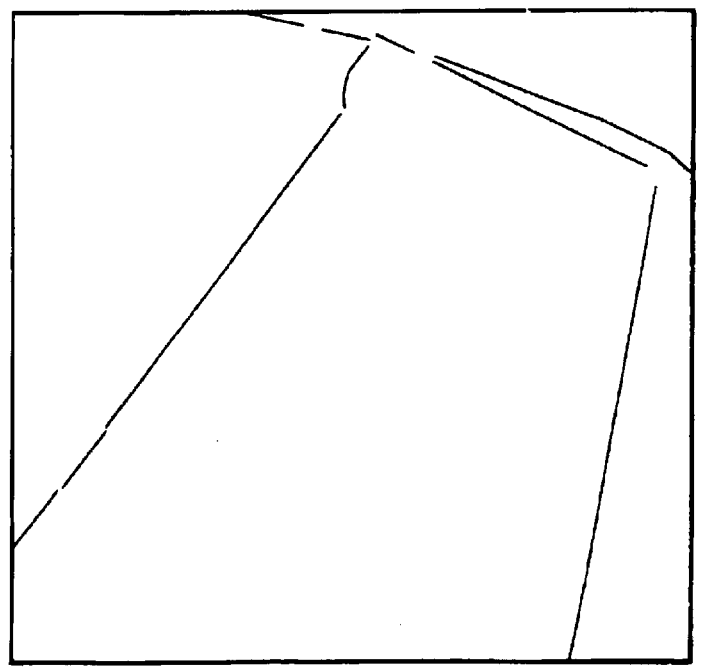
FIG. 13 depicts a network outline, after final merging of the bipoints.

Then there remains in the result segment only the bipoints making up the outline of the processed network. One example of a result, from the lists of FIGS. 10A and 10B, is given in FIG. 13. Discontinuities still remain in the network. In addition, the chambers have obviously disappeared.

The following step is the structuring of the bipoints. For this purpose the bipoints are organised so as to group together those which follow each other in the same segment. All the segments thus constituted will be placed in a list of segments.

The purpose of this structuring is to collect together, in the same segment, the contiguous bipoints which belong to the same sections. This organisation will facilitate the analysis of the missing pieces. In addition, this structuring is close to that required at the output of these processings. This is because a section is a separate entity. Each section must therefore preferably be recognised individually, whence this structuring. In order to effect this grouping, it is possible to proceed by proximity analysis.

Thus physical continuity in the very close vicinity of each point making up the bipoint to be extended is sought. This search is carried out step by step, until a possible series is no longer found. All the bipoints thus detected are stored in the same segment. The order in which the bipoints are stored makes it possible to preserve the logical concatenation of the points from one end of the section to the other, the ends being the most important points to locate.

Regrouping processings are also carried out directly from the lists, without returning to the image. These processings use the detection of inclusion as described previously. When a point is detected, the bipoint from which it came in its entirety is of course considered. The relative position of this bipoint is known with respect to the source bipoint.

This is permitted by a classification of each point making up the bipoints. Thus the first element of a bipoint always has a smaller X-axis than its successor. If it is equal, then the classification is effected on the Y-axis of the points under consideration. This makes it possible to know the relative position of the four points processed. The inclination of each bipoint (increasing or decreasing) is also taken into account. The inclusion function then sends back an indicator which specifies the order in which the points must be stored.

The storage order may be disturbed by the presence of a bifurcation. Thus it is no longer one, but two bipoints or more, which may be detected close to a point. There then no long exists a possible order with the structuring used. A structuring in tree form resolves this problem.

Figure 14:
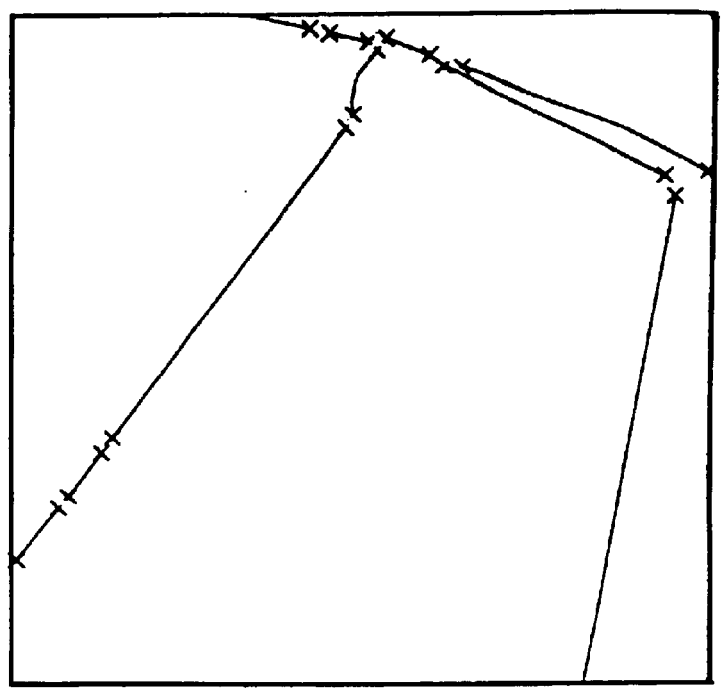
FIG. 14 depicts an outline obtained by structuring of the bipoints.

In FIG. 14, the bipoints grouped together within a segment are delimited by crosses. The results are satisfactory.

The bipoints obtained after this step come from several processings: skeletonisation and then skeleton tracking, polygonalisation, merging and sometimes even polygonalisation once again. Even if the parameterising of the processings preserves the validity of the results, verification may be useful.

This verification is based on a return to the morphological layer of the sections.

The equations of the straight lines passing through each bipoint are calculated. Then, by means of these equations, the layer or initial image is run through, noting the label (the degree of interiority) of each point situated between the two ends of a bipoint. This makes it possible to establish a label percentage on the path, and therefore to verify the percentage to which the bipoint belongs to the layer.

Consequently, it is verified whether each of the points between two ends of a bipoint has a non-zero degree of interiority in the initial image, and therefore belongs to a shape in the image or to a morphological layer.

This processing is carried out as an indication, but could make it possible to call into question a bipoint for a possible recentring on the layer.

It is difficult to draw conclusions on the difference between a 90% validity and a 100% validity. Since the quality of the layer is not perfect, points on a section which do not have a label are thus frequently found. An expansion of this layer resolves this problem. Nevertheless, a validity of less than 80% may seem suspect.

The values encountered up to now are very often up to 100% and in any event greater than 90%.

Figure 15:
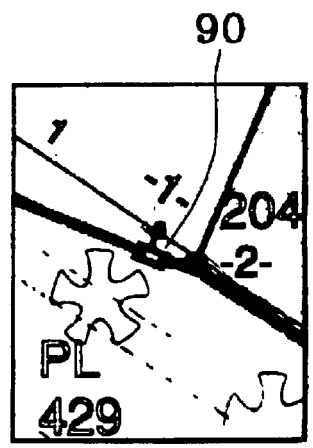
FIG. 15 is an example of chambers on a scanned original drawing.
Figure 16:
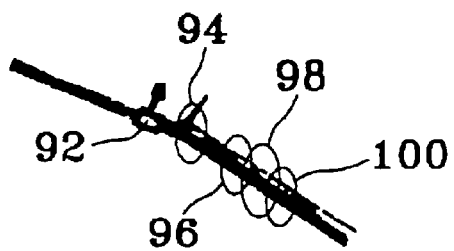
FIG. 16 depicts an example of occlusion.

The principle of the location of the chambers is still to be explained. The starting point is the principle that it is unnecessary to seek to reconstitute the chambers with the information coming from the vectorisation. This is because the skeletonisation and the processings which precede it have made this information fairly inconsistent with the initial representation. The representation on the original drawings is also sometimes itself distorted. Thus a chamber is normally represented by a rectangle. The small size of these elements on a drawing seems to be the cause of these often ovoid representations, as can be seen in FIG. 15, where a chamber is designated by the reference 90.

A first location of the chambers is effected by seeking occlusions on the morphological layer of the sections. This operation is performed by detecting closely related masses. For each occlusion, the coordinates of the enclosing rectangle and the lower perimeter are supplied. The shape 16 represents various possible types of occlusions: some (92) represent a chamber, and others (94, 96, 98, 10) do not.

In order to effect a first filtering on the occlusions, two primitives of the same type as those which made it possible to separate the drawings in accordance with three layers were determined. They are based on the internal perimeter of the occlusions. It has thus been possible to determine, on drawing samples, a minimum perimeter of thirty pixels and a maximum perimeter of one hundred and fifty pixels, for a resolution of 400 dpi. Scaling these parameters may be effected by means of a simple proportionality rule.

This first filtering does not suffice to select solely the occlusions issuing from a chamber. A third primitive is therefore used for validating the hypothesis of a chamber. This third primitive is based on the number of segment ends which are situated in the vicinity where the chamber was detected. Thus, in the very great majority of cases, a chamber is connected to at least two sections. The segment ends (and therefore the sections) are sought, for example, in a square whose centre is the centre of the detected occlusion, and with a side equal for example to 30 pixels. This threshold comes from the experimentation. It functions correctly with the drawings available. An excessively large threshold may cause a false detection. An excessively small threshold may cause non-detection. Scaling this threshold is done by proportionality according to the scale of the drawing to be processed.

Validation of the above three primitives gives rise to validation of the detection of the chamber.

The chamber is then represented by a standardised square with a 10 pixel side. Nevertheless, the original coordinates of the chambers will be stored in a vector containing the coordinates of the top left hand point of the rectangle circumscribing the occlusion, and will be the length and height of this rectangle. This approach enables the chambers to be correctly located and recognised.

The shape recognition method or algorithm described may be used by means of a device as already described above, in relation to FIG. 8. The program instructions corresponding to the shape recognition method described above can be stored instead of, or as a complement to, the instructions for the information processing method contained in an image described at the start of the present description.

A device for implementing a shape recognition method according to the invention therefore has:
storage means, for storing image information,
a processor, connected to the storage means, which effects the instructions of:
skeletonisation of the image, in order to establish a skeleton of the image,
polygonalisation using the pixels of the skeleton of the image, in order to generate bipoint segments,
structuring of the bipoints in order to collect together those belonging to the same shape of the image.

Other instructions can be effected by the processor, which correspond to particular embodiments of the shape recognition method according to the invention as described above.

A device or system according to the invention uses a program for a computer resident on a support medium which can be read by a computer and which contains instructions enabling the computer to implement the shape recognition method according to the invention, and in particular the three steps which have just been stated above. It may also contain other instructions for performing other steps of the shape recognition method as described in the present application.

What is claimed is:

1. A method of processing information contained in an image (4), including:
a first processing (1-4) for defining an area of interest of the image (8), said area of interest being computed from a frequency distribution of the image,
effecting an adaptive thresholding (1-8) of the area of interest in order to obtain a thresholded image (10) of the area of interest, referred to as the first thresholded image,
segmentation (1-12) of the thresholded image, in order to obtain a first set of morphological layers (14-1, 14-2, 14-3 . . . ) of the thresholded image, shape recognition processing applied to each of the morphological layers of the first set of morphological layers, the shape recognition processing applied including:
a skeletonisation of each morphological layer, in order to establish a skeleton of elements of this layer,
a polygonalisation using the pixels of the skeleton of this layer, in order to generate segments or bipoints, a processing for determining the shapes to be recognised at the level of the multiple points, following the polygonalisation, the processing for determining the shapes to be recognised at the level of the multiple points including the use of first and second skeleton-tracking algorithms:

the first algorithm effecting a line tracking favoring a bifurcation to the left in the case of a multiple node, generating a first skeleton tracking, the second algorithm effecting a line tracking favoring a bifurcation to the right in the case of a multiple node, generating a second skeleton tracking, a structuring of the bipoints, in order to collect together those belonging to one and the same share of the morphological layer, merging the data resulting from the application of two skeleton-tracking algorithms, in order to eliminate the redundant information contained in the two skeleton trackings, the merging of the data including the determination of the segments, or bipoints, of one of the skeleton trackings, which are included, partially or totally, in the other, and performing the steps of:
a) the establishment of a single list of bipoints, in increasing order of length,
b) the selection of the largest of the bipoints in this last list,
c) seeking of partial inclusion with the other bipoints,
d) when a partially included bipoint is found during the previous step, testing the two bipoints by polygonalisation,
e) if the result of step d) is positive, the erasure of the bipoints, replacement by the merged bipoint, and return to step c),
f) the continuation of step c), if the result of step d) has more than two points,
g) if step d) supplies no new bipoints, the storage of the last bipoint issuing from step d), the erasure of this bipoint from the list of bipoints established at step a), and return to step a).

2. A method according to claim 1, the first processing (14) making it possible to define an area of interest of the image, being effected by thresholding or multithresholding.

3. A method according to claim 2, the thresholding or multithresholding steps using the OTSU or KITTLER-ILLINGWORTH algorithm.

4. A method according to claim 1, the first processing being followed by a step of refining the area of interest of the image.

5. A method according to claim 4, the refinement step being performed by expansion or erosion of the area of interest defined in the image.

6. A method according to claim 1, including, after segmentation of the thresholded image, performance of a step of thresholding the parts of the thresholded image corresponding to one of the morphological layers, the image obtained being referred to as the second thresholded image (16-1, 16-2, 16-3, . . . ).

7. A method according to claim 6, the second thresholded image being segmented, in order to obtain a second set of morphological layers.

8. A method according to claim 7, in which a shape recognition processing is applied to each of the layers of the second set of morphological layers.

9. A method according to claim 1, each morphological layer connecting together closely related masses of pixels of the image.

10. A method according to claim 1, the image being a technical drawing.

11. A method according to claim 1, the skeletonisation including:
a search for the degree of interiority of each pixel,
a search for the pixels with the highest degree of interiority.

12. A method according to claim 1, the total (or partial) inclusion of a bipoint, referred to as the bipoint to be tested, in a bipoint, referred to as the source bipoint, being determined as a function of the following criteria:
the presence of the bipoint to be tested (74, 76), or of one of its ends, in a predetermined region (72) around the source bipoint (70),
a distance, between the bipoint to be tested (74, 76) and the source bipoint (70), less than a certain threshold.

13. A method according to claim 12, the threshold being equal to the degree of interiority of the source bipoint.

14. A method according to claim 1, also including a step of eliminating the bipoints of one of the skeleton trackings, which are completely included in the other, and vice-versa.

15. A method according to claim 1, also including a step of merging the bipoints (80, 82) of each of the two lists which are partially included in the other list.

16. A method according to claim 15, including the merging of the colinear bipoints (82) into a single bipoint.

17. A method according to claim 16, the colinearity of the two bipoints being determined by applying a polygonalisation algorithm to these two bipoints, the degree of interiority of one of the two bipoints being taken as a margin of error.

18. A method according to claim 1, also including a step for collecting together the contiguous bipoints in one and the same segment.

19. A method according to claim 18, the collecting together of the contiguous bipoints being effected by seeking, step by step, physical continuity in the very close vicinity of each point of a bipoint to be extended by contiguity.

20. A method according to one of claims 18 or 19, the collecting together of the contiguous bipoints in the same segment using an inclusion algorithm.

21. A method according to claim 18, the bipoints being structured in the form of trees at the bifurcation points.

22. A method according to claim 1, also including a verification step consisting of verifying whether each point in the bipoint is contained in one of the elements in the layer.

23. A method according to claim 1, the layer subjected to the shape recognition method having chambers situated at ends of sections, this method also including a step of seeking occlusions (92, 94, 96, 98, 100) in the layer, a step of filtering the occlusions, and a step of seeking the number of section ends situated in the vicinity where a chamber (90) was detected.

24. A method according to claim 23, the occlusions being sought by the detection of closely related masses.

25. A method according to one of claims 23 or 24, the filtering being effected as a function of the internal perimeter of each occlusion.

26. A device for performing a method of processing information contained in an image, the device comprising:
first processing means for defining an area of interest of the image, said area of interest being computed from a frequency distribution of the image;
thresholding means for effecting an adaptive thresholding of the area of interest in order to obtain a thresholded image of the area of interest in order to obtain a threshold image of the area of interest, referred to as the first thresholded image;

segmentation means for segmentation of the thresholded image in order to obtain a first set of morphological layers of the thresholded image;

shape recognition means for applying a shape recognition method or processing, the shape recognition means comprising:

skeletonisation means for effecting a skeletonisation of each morphological layer, in order to establish a skeleton of elements of this layer, polygonalisation means for effecting a polygonalisation from the pixels of the skeleton of this layer, and structuring means for structuring the bipoints and collecting together those belonging to one and the same shape in this layer:

second processing means for determining the shapes to be recognised at the level of the multiple points, following the polygonalisation, the processing for determining the shapes to be recognised at the level of the multiple points including the use of first and second skeleton-tracking algorithms, the first algorithm effecting a line tracking favoring a bifurcation to the left in the case of a multiple node, generating a first skeleton tracking, and the second algorithm effecting a line tracking favoring a bifurcation to the right in the case of a multiple node, generating a second skeleton tracking;

merging means for merging the data resulting from the application of two skeleton-tracking algorithms, in order to eliminate the redundant information contained in the two skeleton trackings, the merging of the data including the determination of the segments, or bipoints, of one of the skeleton trackings, which are included, partially or totally, in the other, and means for performing the steps of:

a) the establishment of a single list of bipoints, in increasing order of length, b) the selection of the largest of the bipoints in this last list, c) seeking of partial inclusion with the other bipoints, d) when a partially included bipoint is found during the previous step, testing the two steps by polygonalisation, e) if the result of step d) is positive, the erasure of the bipoints, replacement by the merged bipoint, and return to step c), f) the continuation of step c), if the result of step d) has more than two points, g) if step d) supplies no new bipoints, the storage of the last bipoint issuing from step d) the erasure of this bipoint from the list of bipoints established at step a), and return to step a).

27. A device according to claim 26, having means for executing first and second skeleton-tracking algorithms:

the first algorithm effecting a line tracking favoring a bifurcation to the left in the case of a multiple node, generating a first skeleton tracking, the second algorithm effecting a line tracking favoring a bifurcation to the right in the case of a multiple node, generating a second skeleton tracking.

28. A device according to claim 27, the means for executing first and second skeleton-tracking algorithms also making it possible to merge the data resulting from the execution of the two skeleton-tracking algorithms, in order to eliminate the redundant information contained in the two skeleton trackings.

29. A device according to one of claims 26 or 27, having means for collecting together the contiguous bipoints in one and the same segment.

\* \* \* \* \*

UNITED STATES PATENT AND TRADEMARK OFFICE
CERTIFICATE OF CORRECTION

PATENT NO. : 6,901,168 B1
DATED : May 31, 2005
INVENTOR(S) : Gardes et al.

It is certified that error appears in the above-identified patent and that said Letters Patent is hereby corrected as shown below:

Column 3,
Line 31, after "same", please delete "," (comma).

Column 8,
Line 12, please delete "$C_1$ and $C_2$" and insert therefor -- $C_1$ and $C_2$ --.

Column 9,
Lines 33-34, please delete the formula identified at (4) and insert the following formula
-- $\in(g, T) = -21\log(h(g).e(g,T)) = -21\log(h(g/i,T . \Box i(T))$ --.

Column 15,
Line 54, please delete the first occurrence of "is".

Column 19,
Line 14, please delete "share" and insert therefor -- shape --.

Signed and Sealed this

Eleventh Day of October, 2005

JON W. DUDAS
*Director of the United States Patent and Trademark Office*